United States Patent
Caine et al.

(10) Patent No.: US 12,461,532 B2
(45) Date of Patent: Nov. 4, 2025

(54) ROBUST BEHAVIOR PREDICTION NEURAL NETWORKS THROUGH NON-CAUSAL AGENT BASED AUGMENTATION

(71) Applicant: Waymo LLC, Mountain View, CA (US)

(72) Inventors: Benjamin James Caine, San Francisco, CA (US); Khaled Refaat, Mountain View, CA (US); Benjamin Sapp, Marina del Rey, CA (US); Scott Morgan Ettinger, San Carlos, CA (US); Wei Chai, Cupertino, CA (US); Rebecca Dawn Roelofs, Oakland, CA (US); Liting Sun, Cupertino, CA (US)

(73) Assignee: Waymo LLC, Mountain View, CA (US)

(*) Notice: Subject to any disclaimer, the term of this patent is extended or adjusted under 35 U.S.C. 154(b) by 293 days.

(21) Appl. No.: 18/118,696

(22) Filed: Mar. 7, 2023

(65) Prior Publication Data
US 2023/0280753 A1    Sep. 7, 2023

Related U.S. Application Data

(60) Provisional application No. 63/317,537, filed on Mar. 7, 2022.

(51) Int. Cl.
*G05D 1/02* (2020.01)
*G05D 1/00* (2006.01)
(Continued)

(52) U.S. Cl.
CPC .......... *G05D 1/0221* (2013.01); *G06V 10/774* (2022.01); *G06V 10/82* (2022.01); *G06V 20/54* (2022.01)

(58) Field of Classification Search
CPC ...... G06V 10/774; G06V 10/77; G06V 10/70; G06V 10/82; G06V 20/00; G06V 20/50;
(Continued)

(56) References Cited

U.S. PATENT DOCUMENTS 12,128,887 B1 * 10/2024 Kiiski ................ G06V 20/58
12,190,625 B2 *  1/2025 Noy .................... G06N 3/044
(Continued)

OTHER PUBLICATIONS

Chen, Robust Machine Learning Models and Their Applications Nov. 25, 2020, Massachusetts Institute of Technology, pp. 1-172 (Year: 2020).*

(Continued)

*Primary Examiner* — Erin M Piateski
*Assistant Examiner* — Ashley Tiffany Schoech
(74) *Attorney, Agent, or Firm* — Fish & Richardson P.C.

(57) ABSTRACT

Methods, systems, and apparatus for predicting future trajectories of agents in an environment. In one aspect, a system comprises one or more computers configured to receive a data set comprising multiple training examples. The training examples include scene data comprising respective agent data for multiple agents and a ground truth trajectory for a target agent that represents ground truth motion of the target agent after a corresponding time point. The one or more computers obtain data identifying one or more of the multiple agents as non-causal agents for each training example. A non-causal agent is an agent whose states do not cause the ground truth trajectory for the target agent to change. The one or more computers generate a respective modified training example from each of the multiple training examples.

20 Claims, 5 Drawing Sheets

(51) Int. Cl.
  *G06V 10/774*  (2022.01)
  *G06V 10/82*  (2022.01)
  *G06V 20/54*  (2022.01)
(58) Field of Classification Search
  CPC ........ G06V 20/52; G06V 20/54; G06V 20/58;
       G06V 20/56; G05D 1/00; G05D 1/02;
        G05D 1/021; G05D 1/0287; G05D
          1/0212; G05D 1/0221
  See application file for complete search history.

(56) References Cited

U.S. PATENT DOCUMENTS

| | | | | |
|---|---|---|---|---|
| 2001/0027371 | A1* | 10/2001 | Winner | B60K 31/0008 701/96 |
| 2019/0072966 | A1* | 3/2019 | Zhang | G05D 1/646 |
| 2021/0046924 | A1* | 2/2021 | Caldwell | B60W 30/09 |
| 2021/0276547 | A1* | 9/2021 | Narayanan | B60W 30/0956 |

OTHER PUBLICATIONS

The Essential Guide to Quality Training Data for Machine Learning Jan. 17, 2022, cloudfactory (Year: 2022).*

Saadatnejad et al., Are socially-aware trajectory prediction models really sociallyaware? Aug. 24, 2021, CoRR, pp. 1-11 (Year: 2021).*

Mangalam et al., It Is Not the Journey But the Destination: Endpoint Conditioned Trajectory Prediction 2020, Springer Nature Switzerland AG, LNCS 12347, pp. 759-776 (Year: 2020).*

Mania et al., A Framework for Self-Training Perceptual Agents in Simulated Photorealistic Environments May 24, 2019, ICRA, pp. 4396-4402 (Year: 2019).*

Volz, Learning to Predict Pedestrians for Urban Automated Driving 2020, Autonomous Systems Lab Department of Mechanical and Process Engineering ETH Zurich Switzerland, No. 26578, i-137 (Year: 2020).*

Rhinehart et al., Precog: Prediction conditioned on goals in visual multi-agent settings 2019. ICCV, pp. 2821-2830 (Year: 2019).*

Aksoy et al., "See, attend and brake: An attention based saliency map prediction model for end-to-end driving," CoRR, Feb. 24, 2020, arXiv:2002.11020, 21 pages.

Bera et al., "Glmp-realtime pedestrian path prediction using global and local movement patterns," 2016 IEEE International Conference on Robotics and Automation (ICRA), May 16-21, 2016, pp. 5528-5535.

Biggio et al., "Evasion attacks against machine learning at test time," Machine Learning and Knowledge Discovery in Databases, 2013, pp. 387-402.

Biggio et al., "Wild patterns: Ten years after the rise of adversarial machine learning," Pattern Recognition, Dec. 2018, 84:317-331.

Casas et al., "SpAGNN: Spatially-aware graph neural networks for relational behavior forecasting from sensor data," 2020 IEEE International Conference on Robotics and Automation, May 31-Aug. 31, 2020, pp. 9491-9497.

Chai et al., "Multipath: Multiple probabilistic anchor trajectory hypotheses for behavior prediction," Proceedings of the Conference on Robot Learning, 2020, 100:86-99.

Cui et al., "Multimodal trajectory predictions for autonomous driving using deep convolutional networks," 2019 International Conference on Robotics and Automation (ICRA), May 20-24, 2019, pp. 2090-2096.

Dhole et al., "NL-augmenter: A framework for task-sensitive natural language augmentation," CoRR, Dec. 8, 2021, arXiv:2112.02721, 40 pages.

Engstrom et al., "Exploring the landscape of spatial robustness," Proceedings of the 36th International Conference on Machine Learning, 2019, 97:1802-1811.

Ettinger et al., "Large scale interactive motion forecasting for autonomous driving: The waymo open motion dataset," Proceedings of the IEEE/CVF International Conference on Computer Vision (ICCV), 2021, pp. 9710-9719.

Fawzi et al., "Manitest: Are classifiers really invariant?," CoRR, Jul. 23, 2015, arXiv:1507.06535, 13 pages.

Geirhos et al., "Generalization in humans and deep neural networks," Advances in neural information processing systems 31, 2018, 13 pages.

Grabchak et al., "The generalized simpson's entropy is a measure of biodiversity," PloS One, Mar. 7, 2017, 12(3):e0173305.

Gu et al., "Using videos to evaluate image model robustness," CoRR, Apr. 22, 2019, arXiv:1904.10076, 10 pages.

Han et al., "Pedestrian motion model using non-parametric trajectory clustering and discrete transition points," IEEE Robotics and Automation Letters, Feb. 10, 2019, 4(3):2614-2621.

Hendrycks et al., "Benchmarking neural network robustness to common corruptions and perturbations," International Conference on Learning Representations, Dec. 20, 2018, 16 pages.

Hong et al., "Rules of the road: Predicting driving behavior with a convolutional model of semantic interactions," Proceedings of the IEEE/CVF Conference on Computer Vision and Pattern Recognition (CVPR), 2019, pp. 8454-8462.

Huynh et al., "Trajectory prediction by coupling scene-LSTM with human movement LSTM," International Symposium on Visual Computing, Oct. 21, 2019, pp. 244-259.

Khandelwal et al., "What-if motion prediction for autonomous driving," CoRR, Aug. 24, 2020, arXiv:2008.10587, 16 pages.

Kooij et al., "Context-based path prediction for targets with switching dynamics," International Journal of Computer Vision, Jul. 2, 2018, 127(3):239-262.

Lee et al., "Desire: Distant future prediction in dynamic scenes with interacting agents," Proceedings of the IEEE Conference on Computer Vision and Pattern Recognition, 2017, pp. 336-345.

Liang et al., "Learning lane graph representations for motion forecasting," European Conference on Computer Vision (ECCV), Nov. 3, 2020, 18 pages.

Makansi et al., "On exposing the challenging long tail in future prediction of traffic actors," Proceedings of the IEEE/CVF International Conference on Computer Vision (ICCV), 2021, pp. 13147-13157.

Mercat et al., "Multi-head attention for joint multi-modal vehicle motion forecasting," IEEE International Conference on Robotics and Automation, May 31, 2020, 7 pages.

Naeem et al., "Reliable fidelity and diversity metrics for generative models," Proceedings of the 37th International Conference on Machine Learning, 2020, 119:7176-7185.

Ngiam et al., "Scene transformer: A unified multitask model for behavior prediction and planning," CoRR, Jun. 15, 2021, arxiv.org/abs/2106.08417, 25 pages.

Radwan et al., "Multimodal interaction-aware motion prediction for autonomous street crossing," The International Journal of Robotics Research, Oct. 1, 2020, 39(13):1567-1598.

Rajaram et al., "Advancing shannon entropy for measuring diversity in systems," Complexity, May 24, 2017, 2017(8715605):10 pages.

Ramanishka et al., "Toward driving scene understanding: A dataset for learning driver behavior and causal reasoning," Proceedings of the IEEE Conference on Computer Vision and Pattern Recognition (CVPR), 2018, pp. 7699-7707.

Recht et al., "Do imagenet classifiers generalize to ImageNet?," Proceedings of the 36th International Conference on Machine Learning, 2019, 97:5389-5400.

Refaat et al., "Agent prioritization for autonomous navigation," 2019 IEEE/RSJ International Conference on Intelligent Robots and Systems (IROS), Nov. 3-8, 2019, pp. 2060-2067.

Rhinehart et al., "Precog: Prediction conditioned on goals in visual multi-agent settings," Proceedings of the IEEE/CVF International Conference on Computer Vision (ICCV), 2019, pp. 2821-2830.

Saadatnejad et al., "Are socially-aware trajectory prediction models really socially-aware?," CoRR, Aug. 24, 2021, arxiv.org/abs/2108.10879v1, 11 pages.

Salzmann et al., "Trajectron++: Dynamically-feasible trajectory forecasting with heterogeneous data," CoRR, Jan. 9, 2020, arxiv.org/abs/2001.03093, 23 pages.

(56) References Cited

OTHER PUBLICATIONS

Scholler et al., "The simpler the better: Constant velocity for pedestrian motion prediction," CoRR, Mar. 19, 2019, arXiv:1903.07933, 8 pages.
Shankar et al., "Do image classifiers generalize across time?," CoRR, Jun. 5, 2019, arxiv.org/abs/1906.02168, 23 pages.
Sun et al., "On complementing end-to-end human behavior predictors with planning," Proceedings of the Robotics: Science and Systems, Jan. 1, 2021, 10 pages.
Szegedy et al., "Intriguing properties of neural networks," International Conference on Learning Representations, Dec. 24, 2013, 10 pages.
Taori et al., "Measuring robustness to natural distribution shifts in image classification," Advances in Neural Information Processing Systems 33, 2020, 17 pages.
Tolstaya et al., "Identifying driver interactions via conditional behavior prediction," 2021 IEEE International Conference on Robotics and Automation (ICRA), May 30, 2021, pp. 3473-3479.
Varadarajan et al., "Multipath++: Efficient information fusion and trajectory aggregation for behavior prediction," CoRR, Nov. 29, 2021, arXiv:2111.14973, 22 pages.
Zhao et al., "Multi-agent tensor fusion for contextual trajectory prediction," Proceedings of the IEEE/CVF Conference on Computer Vision and Pattern Recognition (CVPR), 2019, pp. 12126-12134.
Scholler et al., "What the Constant Velocity Model Can Teach US About Pedestrian Motion Prediction," CoRR, Mar. 19, 2019, arXiv:1903.07933, 8 pages.

\* cited by examiner

ROBUST BEHAVIOR PREDICTION NEURAL NETWORKS THROUGH NON-CAUSAL AGENT BASED AUGMENTATION

CROSS-REFERENCE TO RELATED APPLICATIONS

This application claims priority to U.S. Provisional Patent Application No. 63/317,537, filed on Mar. 7, 2022, the contents of which are hereby incorporated by reference.

BACKGROUND

This specification relates to predicting the future trajectories of agents in an environment using neural networks.

Autonomous vehicles use a variety of on-board sensors and computer systems to detect nearby agents in an environment and use such detections to make control and navigation decisions. The environment may be a real-world environment, and the agent may be, e.g., a vehicle in the environment.

Predicting the future trajectories of agents is a task required for motion planning by an autonomous vehicle, such as self-driving cars, boats, and aircraft.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that trains and evaluates a behavior prediction neural network that generates trajectory predictions for one or more target agents, e.g., a vehicle, a cyclist, or a pedestrian for a scene in an environment. Each trajectory prediction is a prediction that defines the future trajectory of the corresponding target agent starting from a current time point To safely deploy such neural networks, they must make reliable, robust predictions across a diverse range of scenarios, and they must be insensitive to spurious features, or patterns in the data that fail to generalize to new environments. For example, parked cars separated by a barrier from the roadway should not affect a model's predictions for cars driving on the roadway.

One way to generate such reliable predictions would be to train the model on the full set of situations it needed to generalize to after training. However, collecting and labeling the required data to both evaluate and improve model robustness is often expensive and difficult, in part due to the long tail of rare and difficult scenarios.

To mitigate these issues, this specification describes techniques for training a behavior prediction neural network to predict future trajectories of agents by applying perturbations to training data. In particular, this specification describes perturbing training data by removing or otherwise modifying the agent data of non-causal agents in the training data. A non-causal agent is an agent whose removal or deletion from a given scene would not impact the ground truth future trajectory of a target agent in the scene. By being evaluated, trained, or both on data that includes these perturbations, the behavior prediction neural network described in this specification can generate more accurate trajectory predictions than conventional systems and can generalize better to previously un-encountered situations.

Additionally, this specification describes techniques for evaluating the robustness and sensitivity of the behavior prediction neural network to determine whether to deploy the behavior prediction neural network trained on the perturbed training data in a vehicle.

Figure 1:
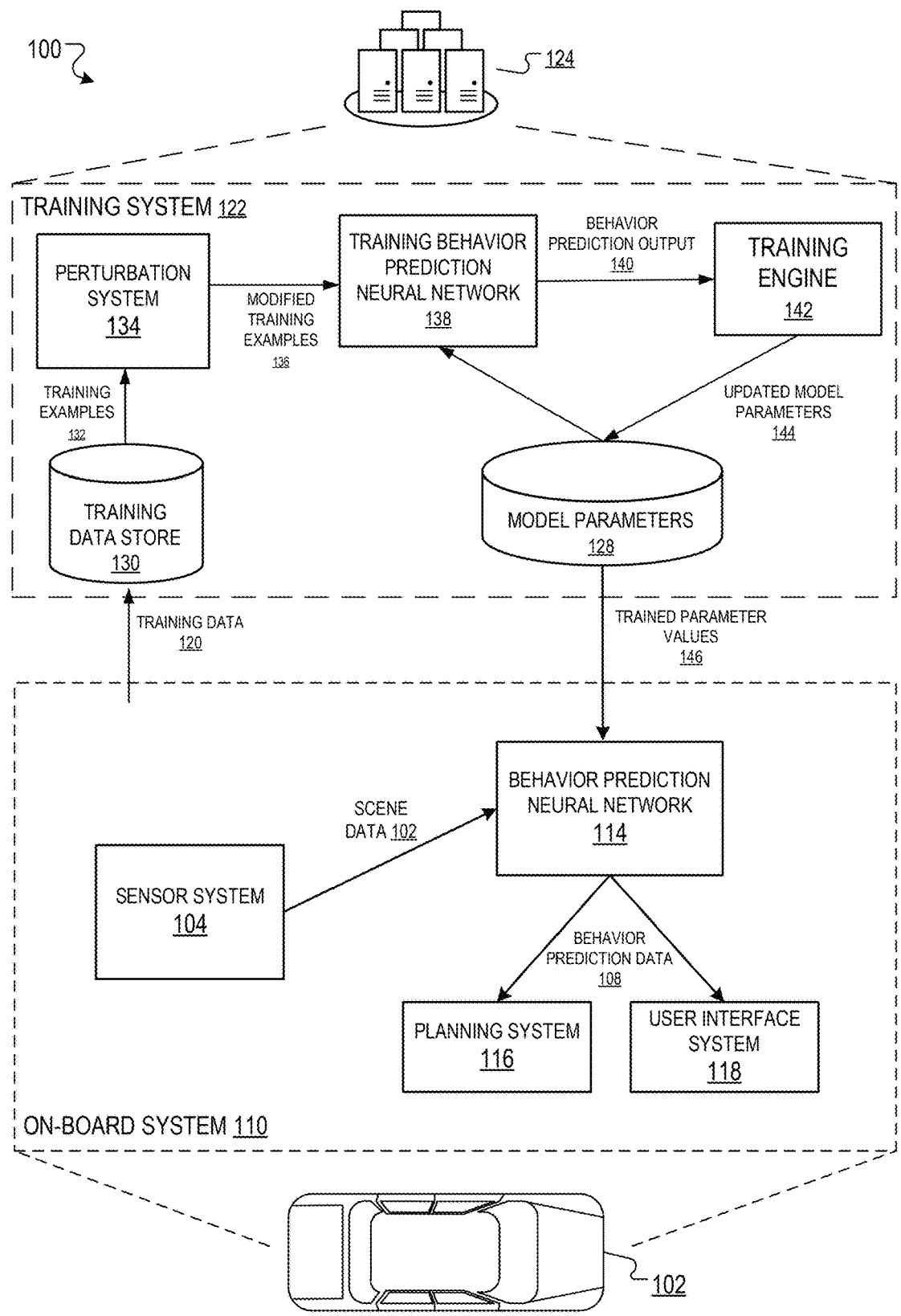
FIG. 1 is a block diagram of an example system.

FIG. 1 shows an example system 100. The system 100 includes an on-board system 110 and a training system 122.

The on-board system 110 is located on-board a vehicle 102. The vehicle 102 in FIG. 1 is illustrated as an automobile, but the on-board system 110 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 102 can alert the driver of the vehicle 102 or take an autonomous driving action when an obstacle is detected, when the vehicle departs from a driving lane, or when an object is detected in a blind spot of the human driver.

The on-board system 110 includes a sensor system 104 which enables the on-board system 110 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

The sensor system 104 continually (i.e., at each of multiple time points) captures raw sensor data, which can indicate the directions, intensities, and distances travelled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The on-board system 110 can process the raw sensor data to generate the scene data 106. The scene data 106 includes agent data for multiple agents in a scene of an environment at a corresponding time point, e.g., respective agent data characterizing states of each agent at the corresponding time point and one or more preceding time points. The on-board system 110 can use the scene data 106 continually generated by the sensor system 104 to track the trajectories of agents (e.g., pedestrians, bicyclists, other vehicles, and the like) in the environment in the vicinity of the vehicle 102.

The trajectory of an agent refers to data defining, for each of multiple time points, the spatial position occupied by the agent in the environment at the time point and characteristics of the motion of the agent at the time point. The characteristics of the motion of an agent at a time point can include, for example, the velocity of the agent (e.g., measured in miles per hour—mph), the acceleration of the agent (e.g., measured in feet per second squared), and the heading of the agent (e.g., measured in degrees). The heading of an agent refers to the direction of travel of the agent and can be expressed as angular data (e.g., in the range 0 degrees to 360 degrees) which is defined relative to a given frame of reference in the environment (e.g., a North-South-East-West frame of reference).

The on-board system 110 processes the scene data 102 generated for the multiple agents using a behavior prediction neural network 114 to generate the behavior prediction data 108 characterizing the future trajectory of a target agent (e.g., the vehicle 102). The behavior prediction neural network 114 can have any appropriate architecture that allows the neural network 114 to map scene data to a behavior prediction for the target agent, e.g., an architecture of a Scene Transformer model, a Multipath++ model, a Pathformer model, and so on.

The on-board system 110 can provide the behavior prediction data 108 generated by the behavior prediction neural network 114 to a planning system 116, a user interface system 118, or both.

When the planning system 116 receives the behavior prediction data 108, the planning system 116 can use the behavior prediction data 108 to make fully-autonomous or partly-autonomous driving decisions. For example, the planning system 116 can generate a fully-autonomous plan to navigate the vehicle 102 to avoid a collision with another agent by changing the future trajectory of the vehicle 102 to avoid the agent. In a particular example, the on-board system 110 may provide the planning system 116 with behavior prediction data 108 indicating that another vehicle which is attempting to merge onto a roadway being travelled by the vehicle 102 is unlikely to yield to the vehicle 102. In this example, the planning system 116 can generate fully-autonomous control outputs to apply the brakes of the vehicle 102 to avoid a collision with the merging vehicle. The fully-autonomous or partly-autonomous driving decisions generated by the planning system 116 can be implemented by a control system of the vehicle 102. For example, in response to receiving a fully-autonomous driving decision generated by the planning system 116 which indicates that the brakes of the vehicle should be applied, the control system may transmit an electronic signal to a braking control unit of the vehicle. In response to receiving the electronic signal, the braking control unit can mechanically apply the brakes of the vehicle.

When the user interface system 118 receives the behavior prediction data 108, the user interface system 118 can use the behavior prediction data 108 to present information to the driver of the vehicle 102 to assist the driver in operating the vehicle 102 safely. The user interface system 118 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the on-board system 110 may provide the user interface system 118 with behavior prediction data 108 indicating that another vehicle which is attempting to merge onto a roadway being travelled by the vehicle 102 is unlikely to yield to the vehicle 102. In this example, the user interface system 118 can present an alert message to the driver of the vehicle 102 with instructions to adjust the trajectory of the vehicle 102 to avoid a collision with the merging vehicle.

The on-board system 110 can generate training data 120 used by a training system 122 to determine trained parameter values of the behavior prediction neural network 114 from the behavior prediction data 108 which is continually generated by the on-board system 110. The on-board system 110 can provide the training data 120 to the training system 122 in offline batches or in an online fashion, for example, continually whenever it is generated.

The training system 122 is typically hosted within a data center 124, which can be a distributed computing system having hundreds or thousands of computers in one or more locations.

The training system 122 can store the training data 120 in a training data store 130.

The training system 122 includes a training behavior prediction neural network 138 that is configured to generate behavior prediction data from input trajectory representation data. The training system 122 includes multiple computing devices having software or hardware modules that implement the respective operations of each layer of the training behavior prediction neural network 138 according to an architecture of the training behavior prediction neural network 138, e.g., an architecture of a Scene Transformer model, a Multipath++ model, a Pathformer model, etc. The training behavior prediction neural network 238 generally has (at least partially) the same architecture as the on-board behavior prediction neural network 114.

Additionally, the training system 122 includes a perturbation system 134. The perturbation system 134 is configured to obtain training examples 132 from the training data store 130. The training examples 132 can be a subset of the training data 120. The training examples 132 in the training data store 130 may be obtained from real or simulated driving data logs.

Each of the training examples 132 includes scene data and a ground truth trajectory for a target agent in the scene. The scene data includes respective agent data for multiple agents in a scene of the environment at a corresponding time point. The multiple agents include the target agent and a set of other agents. The respective agent data characterizes states of each agent of the multiple agents at the corresponding time point and one or more preceding time points.

The ground truth trajectory for the target agent represents ground truth motion of the target agent after the corresponding time point, i.e., represents the actual motion of the target agent that took place after the corresponding time point.

The perturbation system 134 is also configured to generate modified training examples 136 from the training examples 132 by perturbing the training examples 132, as described in further detail with reference to FIGS. 2 and 3, to generate modified scene data from the scene data in each of the training examples 132.

The training behavior prediction neural network 138 can process the modified scene data included in the modified training examples 136 to generate, for each modified training example 136, a respective behavior prediction output 140. The behavior prediction output 140 can include the trajectory predictions of the target agent.

A training engine 142 is configured to analyze the behavior prediction output 140 and compare the behavior prediction output 140 to the ground truth trajectories of the target agent in the training examples 132.

The training engine 142 then generates updated model parameter values 144 by using an appropriate machine learning training technique. The training engine 142 can then update the collection of model parameters 128 using the updated model parameter values 144.

After training is complete, the training system 122 determines whether to deploy the training behavior prediction neural network 138 on-board the vehicle 102, e.g., as part of the on-board system 110. In some implementations, the training system 122 determines whether to deploy the training behavior prediction neural network 138 on-board based on one or more sensitivity measures and one or more robustness measures for the trained behavior prediction neural network, as described in more detail with reference to FIG. 4.

If the training behavior prediction neural network 138 satisfies the sensitivity measures and the robustness measures, the training system 122 can deploy the training behavior prediction neural network 138 by providing a set of trained parameter values 144 to the on-board system 110 for use in making fully- or partly-autonomous driving decisions. The training system 122 can provide the set of trained parameter values 146 by a wired or wireless connection to the on-board system 110.

The robustness of the behavior neural network is a measure of the ability of the training behavior prediction neural network 138 to accurately generate the behavior prediction output 140 across different scenarios and different environments. The sensitivity of the behavior prediction neural network 114 is a measure of the impact of processing the modified training examples 136 in generating the behavior prediction outputs 140.

Therefore, based on the robustness and sensitivity of the training behavior neural network 138, the training behavior neural network 138 can be deployed in a vehicle 102 (e.g., as the behavior prediction neural network 114) to enable the vehicle 102 to make fully-autonomous or partly-autonomous driving decisions, present information to the driver of the vehicle 102 to assist the driver in operating the vehicle 102 safely, or both.

Figure 2:
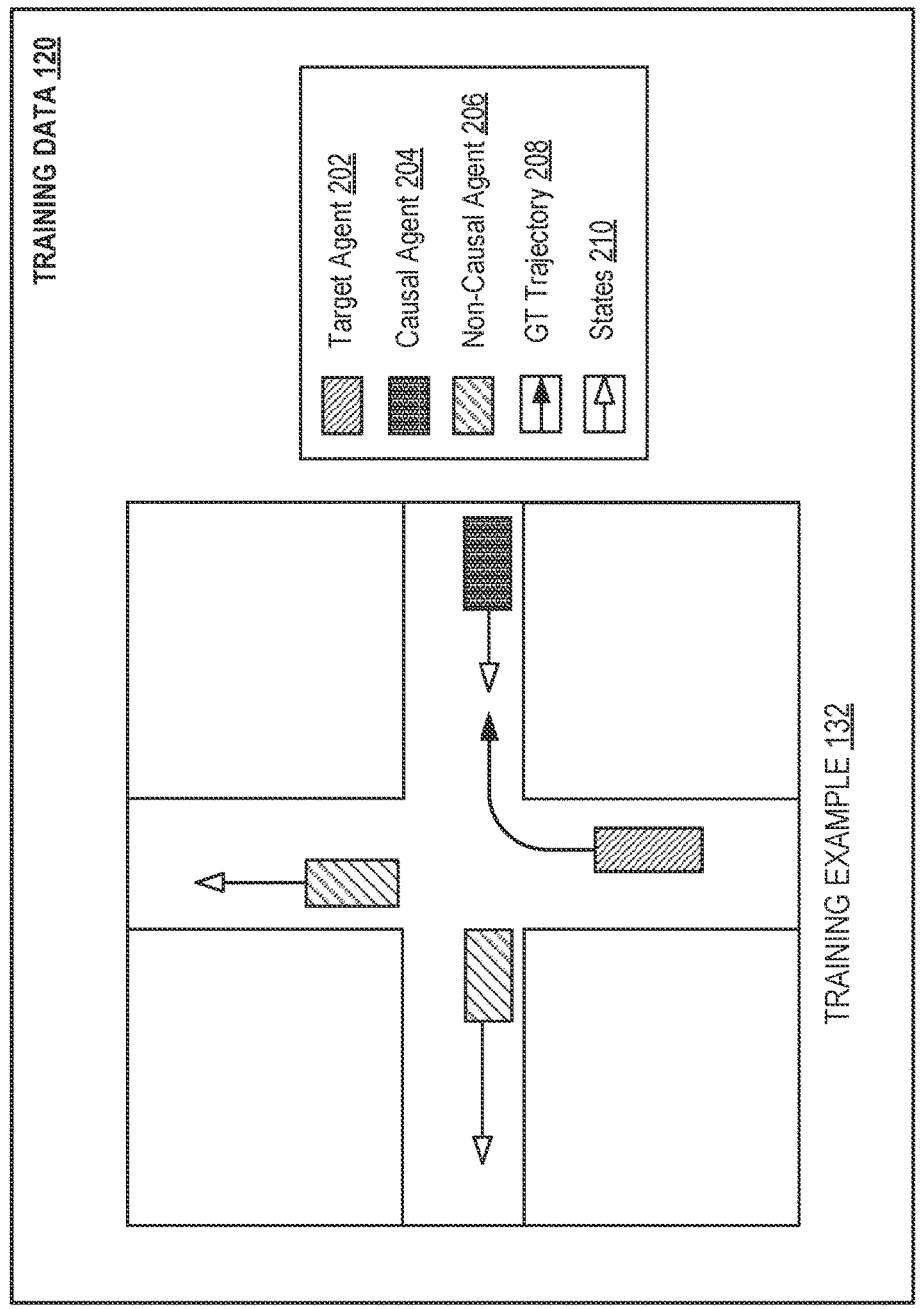
FIG. 2 is a diagram of training data inputs.

FIG. 2 shows a diagram of the training data inputs. For convenience, the training data inputs of the diagram 200 will be described as being processed by a system of one or more computers located in one or more locations. For example, a system, e.g., the system 100 of FIG. 1, appropriately programmed in accordance with this specification, can process the training data inputs of the diagram 200.

Autonomous vehicles collect training data inputs (e.g., training data 120) using an on-board sensor system. The training data inputs can include agent data of multiple agents from camera images or video segments of a scene in the environment navigated by the autonomous vehicle. A training system can train a training behavior prediction neural network by processing training examples 132 of the training data 120 to generate behavior prediction outputs, e.g., trajectory predictions of the target agent.

However, in some examples, behavior prediction neural networks generate the trajectory predictions based on agent data of agents in the environment that do not generalize to different environments, such as non-causal agents. For example, a behavior prediction neural network can generate a trajectory prediction by processing training data that includes agent data of stationary (e.g., parked) cars separated by a barrier from the roadway. In this case, the agent data of the stationary cars can affect the accuracy of the behavior prediction output by decreasing the robustness of the behavior prediction neural network, even though the stationary cars do not directly affect the trajectory of the target agent.

To alleviate the effects of the agent data of non-causal agents on the behavior output predictions, the training behavior prediction neural network is trained on training examples (e.g., modified training examples) that identify which agents are non-causal in regard to a ground truth trajectory of a target agent 202. An agent is non-causal if adding the agent to the scene or removing the agent from the scene would not cause a change in the ground truth trajectory 208 (e.g., GT trajectory 208) of the target agent 202. That is, the states of the agent do not cause the ground truth trajectory of the target agent to change.

For example, users (e.g., human labelers) can identify non-causal agents by submitting inputs to the system, e.g., by viewing video segments included in the training data inputs and identifying which agents in the video segments are non-causal for a given target agent. The user can obtain the video segments from the sensor system on-board the autonomous vehicle or from real or simulated driving data logs.

For each video segment, the user identifies whether some or all agents in the scene is a non-causal agent 204 or a causal agent 206. A non-causal agent 202 is an agent whose states do not cause the ground truth trajectory for the target agent 202 to change. The states of the agent include a 3D center point, a velocity vector, and heading. In some examples, non-causal agents 206 are stationary in the environment (e.g., parked cars).

A user can identify the ground truth trajectory 208 of the target agent 202. The user can determine that the states 210 of an agent affect the ground truth trajectory 208, and the user can label the agent as a causal agent 204. For example, the ground truth trajectory 208 of the target agent 202 and the states 210 of the causal agent 204 show the possibility of a collision between the target agent 202 and the causal agent 204. In order to avoid the collision, the target agent 202 can change the ground truth trajectory 208. Thus, the user can label the agent as causal.

Alternatively, the user can identify an agent whose states 210 do not change the ground truth trajectory 208, and the user can label the agent as non-causal, such as non-causal agent(s) 206. The states 210 of the non-causal agents 206 do not affect the ground truth trajectory 208.

As another example, the system can determine which agents are causal and which are non-causal by applying one or more rules to the state of a given agent and, optionally, states of the target agent. Examples of such rules can include rules that are based on one or more of, whether the given agent is stationary or non-stationary, the distance of the given agent from the target agent, direction of travel of the given agent relative to the target agent, and so on.

The training system then stores the training data 120 in the training data store, and the training system uses training examples from the training data 120 to generate modified training examples, as described in further detail with reference to FIG. 3. In some examples, the training system can use the modified training examples to train the behavior prediction neural network.

Figure 3:
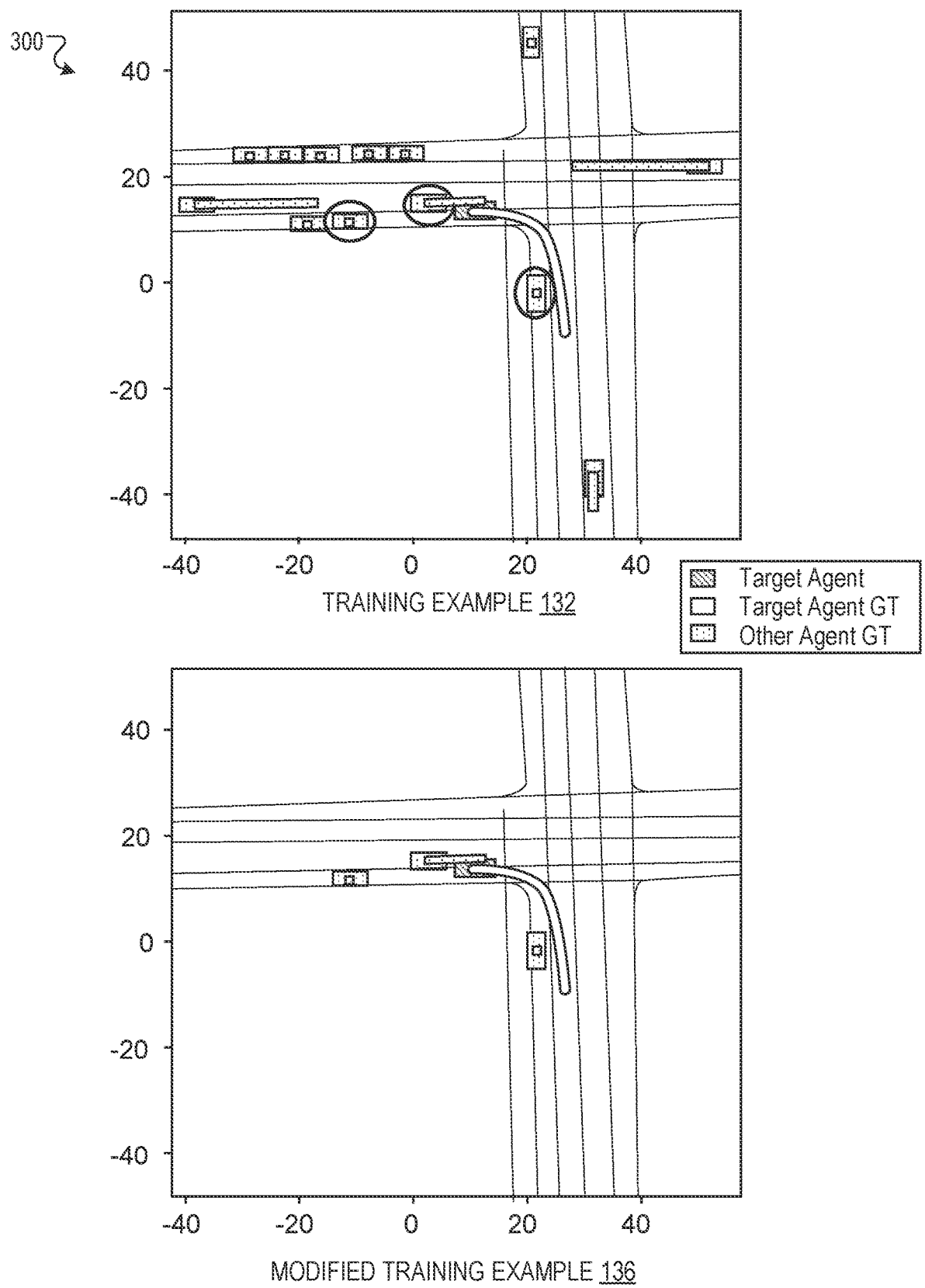
FIG. 3 is a diagram of the training examples and the modified training examples for training a behavioral prediction neural network.

FIG. 3 shows a diagram of the training examples and the modified training examples for training the behavioral prediction neural network. For convenience, the training examples and the modified training examples of the diagram 300 will be described as being processed by a system of one or more computers located in one or more locations. For example, a system, e.g., the system 100 of FIG. 1, appropriately programmed in accordance with this specification, can process the training examples and the modified training examples of the diagram 300.

The diagram 300 includes a training example 132 and a modified training example 136.

The training system uses the perturbation system to generate modified training examples 136 by processing training examples 132. In some examples, the training system uses the modified training examples to train the training behavior neural network.

The training example 132 is a top-down visualization of a scene in an environment. The training example 132 includes agent data for multiple agents from the training data. In particular, the training example 132 features agent data of a target agent and other agents. The other agents include labeled causal agents (circled) and labeled non-causal agents.

The training examples 132 also includes a ground truth trajectory of the target agent (target agent GT) and a ground truth trajectory of the causal agents and the non-causal agents (other agent GT).

The ground truth trajectories of the target agent and the causal agents are based on the states of each of the agents (e.g., 3D center point, a velocity vector, and heading).

The perturbation system processes the training example 132 to generate the modified training example 136 by modifying the training example 132. The perturbation system modifies the training example 132 by applying a perturbation to one or more states of the agent data for each one or more of the other agents. Perturbation refers to modifying existing data (e.g., agent data) via transformations. When performing perturbation of the agent data of a given agent, the perturbation system preserves the agent data of the other agents, and the perturbation system preserves the ground truth trajectory of the target agent.

In some examples, the perturbation system can perturb the agent data by removing all non-causal agents, i.e., removing all states for all non-causal agents from the scene data. The modified training example 136 included in the diagram 300 is generated by removing the non-causal agents from the training example 132 based on the ground truth trajectory of the target agent.

Alternatively, the perturbation system can perturb the agent data by removing a subset of the non-causal agents. For example, the perturbation system can remove a number of randomly selected non-causal agents. The number of randomly selected non-causal agents can be based on, e.g., can be equal to, the number of causal agents in the scene.

As another example, instead of or in addition to removing non-causal agents, the system can apply perturbations to states of non-causal agents, e.g., by adding noise sampled from a specified distribution to the states. Thus, rather than deleting the state data for all the non-causal agents, the system can, for one or more of the non-causal agents, modify the states using random perturbations.

Alternatively or in addition, the perturbation system can perturb the agent data by removing static agents. Static agents include stationary non-causal agents (e.g., parked cars). The perturbation system can determine whether a non-causal agent is stationary based on the states of the non-causal agent. For example, the perturbation system can process the velocity vector or the heading of a non-causal agent to determine whether the non-causal agent is a static agent. For example, the perturbation system can identify parked cars in an environment as static agents because their velocity vectors indicate that their velocity was below a threshold for the entire recent time window covered by the scene data.

The training behavior prediction system then processes the modified training examples 136 to generate the behavior prediction output.

Figure 4:
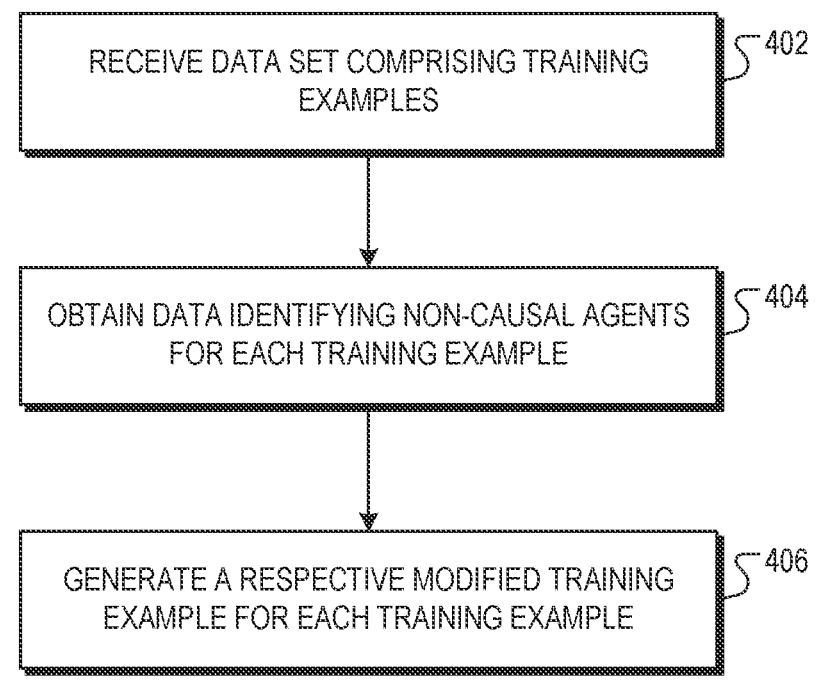
FIG. 4 is a flow diagram of an example process for predicting the future trajectories of agents.

FIG. 4 is a flow diagram of an example process 400 for generating training data. For convenience, the process 400 will be described as being performed by a system of one or more computers located in one or more locations. For example, a system, e.g., the system 100 of FIG. 1, appropriately programmed in accordance with this specification, can perform the process 400.

The system receives a data set of training data that includes multiple training examples (402). Each training example includes scene data that includes respective agent data for multiple agents in a scene of an environment at a corresponding time point. The multiple agents include a target agent and a set of other agents (e.g., causal agents and non-causal agents). The respective agent data characterizes states of each agent of the set of other agents at the corresponding time point and one or more preceding time points. Additionally, each training example includes a ground truth trajectory for the target agent that represents ground truth motion of the target agent after the corresponding time point.

The system obtains, for each training example, data identifying one or more agent of the set of other agents as non-causal agents (404). The data (e.g., training data) labels as non-causal agents the agents whose states do not cause the ground truth trajectory for the target agent to change. In particular, an agent is non-causal if adding the agent to the scene or removing the agent from the scene would not cause a change in the ground truth trajectory of the target agent.

The system then generates a respective modified training example from each training example (406). The system generates the respective modified training example by generating modified scene data from the scene data in the training example. The system generates the modified scene data by modifying the respective agent data for one or more of the identified noncausal agents. The system can modify the scene data as described above with respect to FIG. 3. The modified training example includes the modified scene data and the ground truth trajectory for the target agent in the training example.

Figure 5:
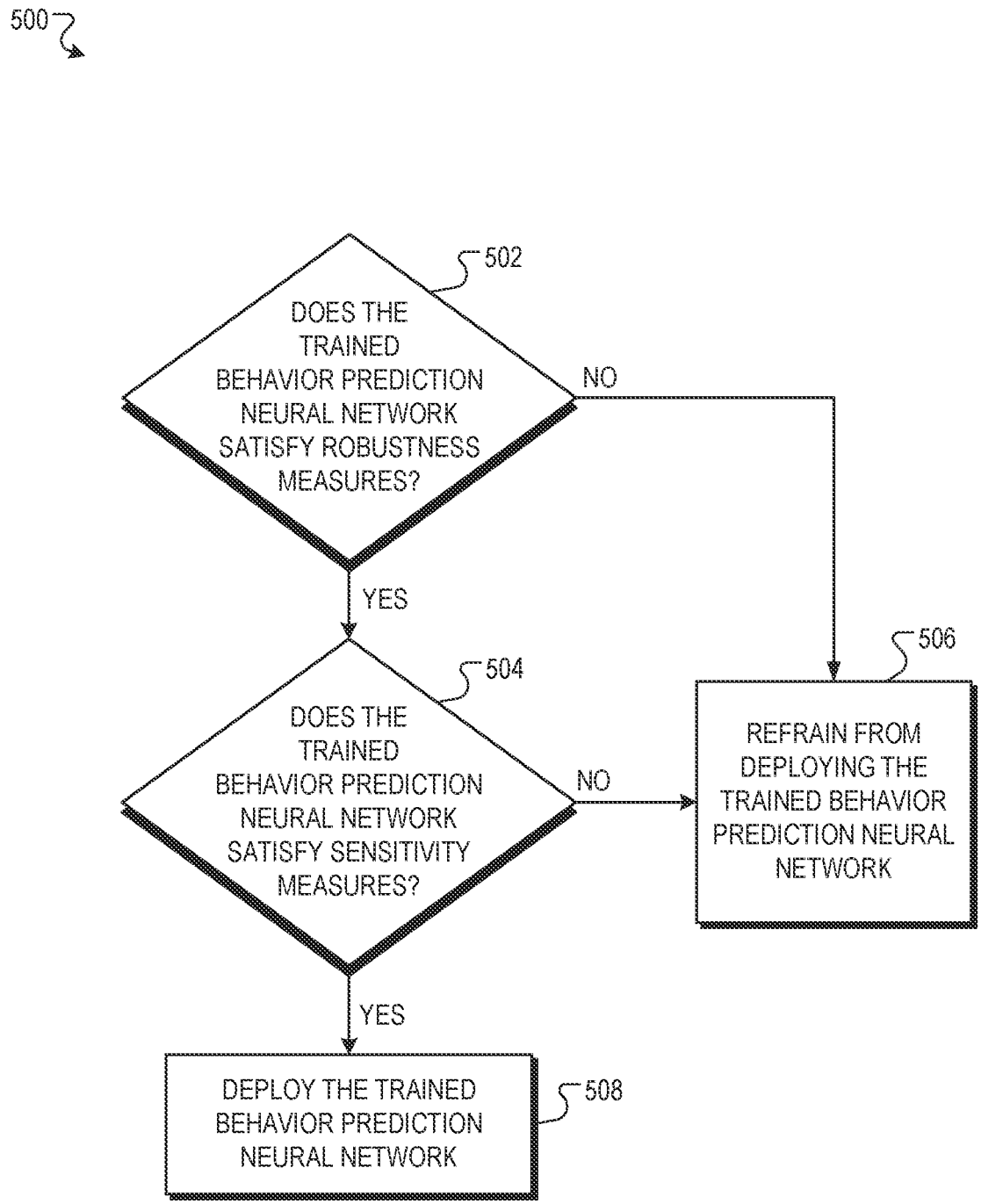
FIG. 5 is a flow diagram of an example process 500 for determining robustness and sensitivity measures of the trained behavioral prediction neural network.

FIG. 5 is a flow diagram of an example process 500 for determining robustness and sensitivity measures of the trained behavioral prediction neural network. For convenience, the process 500 will be described as being performed by a system of one or more computers located in one or more locations. For example, a system, e.g., the system 100 of FIG. 1, appropriately programmed in accordance with this specification, can perform the process 500.

The system determines whether the trained behavior prediction neural network satisfies one or more robustness measures (502). The system can determine one or more robustness measures for the trained behavior prediction neural network by comparing, for a set of modified training examples, the behavior prediction output for the target agent generated from the modified training example and the behavior prediction output for the target agent generated from the corresponding training example (e.g., the original training example) based on the ground truth trajectory for the target agent.

The system can use minimum average displacement error (minADE) to measure a robustness metric of the trained behavior prediction neural network. The minADE is an average distance between the forecasted trajectory (e.g., the behavior prediction output) and the ground truth (e.g., the ground truth trajectory) of the target agent.

The robustness metric is shown by Equation 1:

$$\text{Abs}(\Delta) = \frac{1}{n}\sum_{i=1}^{n} |\text{ptb\_minADE}(i) - \text{ori\_minADE}(i)| \quad (1)$$

where Abs($\Delta$) is the absolute change in minADE and n is the number of training examples. Additionally, ptb_minADE(i) is the minADE between the behavior prediction output based on the modified training example and the ground truth trajectory of the target agent, and ori_minADE(i) is the minADE between the behavior prediction output based on the original training example and the ground truth trajectory of the target agent.

The system can determine whether the robustness metric (e.g., the absolute change in minADE) satisfies a threshold to determine whether to deploy the trained behavior prediction neural network on the vehicle. If the robustness metric of the trained behavior prediction neural network fails to satisfy the threshold, the system refrains from deploying the trained behavior prediction neural network (506).

If the robustness metric of the behavior prediction neural network satisfies the threshold, the system can also determine whether the trained behavior prediction neural network satisfies one or more sensitivity measures (504). The system can determine one or more sensitivity measures for the trained behavior prediction neural network based on the behavior prediction output for the target agent generated by processing the modified training example and the behavior prediction output for the target agent in the modified training example generated by processing the training example.

For example, the system can determine one or more sensitivity metrics based on the different perturbations of the agent data. For example, the different perturbations can include removing all of the non-causal agents, removing a subset of the non-causal agents, removing the static agents, and removing all of the causal agents.

The sensitivity metric is an intersection over union (IoU) based metric that measures the similarities between two trajectory predictions. In particular, the sensitivity metric measures the magnitude of the differences between a trajectory prediction generated from the modified training example (e.g., with perturbation) and a trajectory prediction generated from the original training example (e.g., without perturbation). The system can compute the sensitivity metric for each of the different perturbations.

For each of the training examples and for each of the different perturbations, the system calculates the sensitivity metric by projecting the two predicted trajectories as sets of voxels in a 2D top-down grid. The system then determines the sensitivity metric by dividing the number of voxels that overlap between the two predicted trajectories by the total number of voxels of the two predicted trajectories. Thus, the sensitivity metric quantifies "how geometrically different the trajectories look". A sensitivity metric of 1 means the two trajectories are not meaningfully different, and a sensitivity metric of 0 means that the two trajectories do not overlap at all.

The system can determine whether the sensitivity metric satisfies a threshold to determine whether to deploy the trained behavior prediction neural network on the vehicle. If the sensitivity metric of the trained behavior prediction neural network fails to satisfy the threshold, the system refrains from deploying the trained behavior neural network (506).

If both the robustness metric and the sensitivity metric satisfy the respective thresholds, the system can deploy the trained behavior prediction neural network on the vehicle (508).

This specification uses the term "configured" in connection with systems and computer program components. For a system of one or more computers to be configured to perform particular operations or actions means that the system has installed on IT software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more computers, the method comprising:
receiving a training example identifying (i) respective agent data for each of a plurality of agents in a scene of an environment at a corresponding time point, the plurality of agents comprising a target agent and a set of other agents, and (ii) a ground truth trajectory for the target agent that represents ground truth motion of the target agent after the corresponding time point;
obtaining data identifying, as non-causal agents, one or more of the set of other agents identified in the training example; and
generating a modified training example by modifying the respective agent data for one or more of the other agents that were identified as non-causal agents, the generating comprising:
removing the respective agent data for a set of non-causal agents, wherein a number of non-causal agents in the set is based on a number of causal agents in the scene.

2. The method of claim 1, further comprising:
training a behavior prediction neural network on training data that includes the modified training example.

3. The method of claim 1, further comprising:
processing modified scene data comprising the modified agent data in the modified training example using a trained behavior prediction neural network to generate a behavior prediction output for the target agent in the modified training example;
determining one or more robustness measures for the trained behavior prediction neural network based on (i) the behavior prediction output for the target agent in the modified training example and (ii) the ground truth trajectory for the target agent in the training example.

4. The method of claim 3, further comprising:
processing scene data in the corresponding training example using the trained behavior prediction neural network to generate a behavior prediction output for the target agent in the training example; and
determining one or more sensitivity measures for the trained behavior prediction neural network based on (i) the behavior prediction output for the target agent in the modified training example generated by processing the modified training example and (ii) the behavior prediction output for the target agent in the modified training example generated by processing the training example.

5. The method of claim 4, further comprising:
determining whether to deploy the trained behavior prediction neural network on-board an autonomous vehicle based at least on the one or more sensitivity measures for the trained behavior prediction neural network.

6. The method of claim 5, further comprising:
determining whether to deploy the trained behavior prediction neural network on-board an autonomous vehicle based at least on the one or more robustness measures for the trained behavior prediction neural network.

7. The method of claim 1, wherein obtaining data identifying, as non-causal agents, one or more of the set of other agents in the scene for the training example comprises:
obtaining inputs from one or more users labeling agents in the scene as causal or non-causal agents.

8. The method of claim 1, wherein obtaining data identifying, as non-causal agents, one or more of the set of other agents in the scene for the training example comprises:
determining that one or more stationary agents in the scene are non-causal agents.

9. A method performed by one or more computers, the method comprising:
receiving a training example identifying (i) respective agent data for each of a plurality of agents in a scene of an environment at a corresponding time point, the plurality of agents comprising a target agent and a set of other agents, and (ii) a ground truth trajectory for the target agent that represents ground truth motion of the target agent after the corresponding time point;
obtaining data identifying, as non-causal agents, one or more of the set of other agents identified in the training example; and
generating a modified training example by modifying the respective agent data for one or more of the other agents that were identified as non-causal agents, the generating comprising:
applying perturbations to the respective agent data of one or more of the identified non-causal agents by sampling from a particular distribution for the identified non-causal agent.

10. The method of claim 9, further comprising:
training a behavior prediction neural network on training data that includes the modified training example.

11. The method of claim 9, further comprising:
processing modified scene data comprising the respective modified agent data in the modified training example using a trained behavior prediction neural network to generate a behavior prediction output for the target agent in the modified training example; and
determining one or more robustness measures for the trained behavior prediction neural network based on (i) the behavior prediction output for the target agent in the modified training example and (ii) the ground truth trajectory for the target agent in the training example.

12. The method of claim 11, further comprising:
processing scene data in the corresponding training example using the trained behavior prediction neural network to generate a behavior prediction output for the target agent in the training example; and
determining one or more sensitivity measures for the trained behavior prediction neural network based on, for each modified training example, (i) the behavior prediction output for the target agent in the modified training example generated by processing the modified training example and (ii) the behavior prediction output for the target agent in the modified training example generated by processing the training example.

13. The method of claim 12, further comprising:
determining whether to deploy the trained behavior prediction neural network on-board an autonomous vehicle based at least on the one or more sensitivity measures for the trained behavior prediction neural network.

14. The method of claim 13, further comprising:
determining whether to deploy the trained behavior prediction neural network on-board an autonomous vehicle based at least on the one or more robustness measures for the trained behavior prediction neural network.

15. The method of claim 9, wherein obtaining data identifying, as non-causal agents, one or more of the set of other agents in the scene for the training example comprises:
obtaining inputs from one or more users labeling agents in the scene as causal or non-causal agents.

16. The method of claim 9, wherein obtaining data identifying, as non-causal agents, one or more of the set of other agents in the scene for the training example comprises:
determining that one or more stationary agents in the scene are non-causal agents.

17. A system comprising:
one or more computers; and
one or more storage devices storing instructions that when executed by one or more computers cause the one or more computers to perform operations comprising:
receiving a training example identifying (i) respective agent data for each of a plurality of agents in a scene of an environment at a corresponding time point, the plurality of agents comprising a target agent and a set of other agents, and (ii) a ground truth trajectory for the target agent that represents ground truth motion of the target agent after the corresponding time point;
obtaining data identifying, as non-causal agents, one or more of the set of other agents identified in the training example; and
generating a modified training example by modifying the respective agent data for one or more of the other agents that were identified as non-causal agents, the generating comprising:
removing the respective agent data for a set of non-causal agents, wherein a number of non-causal agents in the set is based on a number of causal agents in the scene.

18. The system of claim 17, wherein the operations further comprise:
training a behavior prediction neural network on training data that includes the modified training example.

19. The system of claim 17, wherein the operations further comprise:
processing modified scene data comprising the respective modified agent data in the modified training example using a trained behavior prediction neural network to generate a behavior prediction output for the target agent in the modified training example; and
determining one or more robustness measures for the trained behavior prediction neural network based on (i) the behavior prediction output for the target agent in the modified training example and (ii) the ground truth trajectory for the target agent in the training example.

20. The system of claim 19, wherein the operations further comprise:
processing scene data in the corresponding training example using the trained behavior prediction neural network to generate a behavior prediction output for the target agent in the training example; and
determining one or more sensitivity measures for the trained behavior prediction neural network based on (i) the behavior prediction output for the target agent in the modified training example generated by processing the modified training example and (ii) the behavior prediction output for the target agent in the modified training example generated by processing the training example.

* * * * *